United States Patent
Lovette

(10) Patent No.: US 6,747,985 B1
(45) Date of Patent: Jun. 8, 2004

(54) SYSTEMS AND METHODS FOR OPTIMIZING COMMUNICATIONS IN AN ETHERNET NETWORK

(75) Inventor: Steven E. Lovette, Keller, TX (US)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/128,347

(22) Filed: Aug. 3, 1998

(51) Int. Cl.[7] .............................. H04L 12/43; H04J 3/16
(52) U.S. Cl. ........................................ 370/460; 370/468
(58) Field of Search ................................ 370/445, 230, 370/235, 424, 452, 458, 460, 468; 709/203, 223, 224, 225, 226, 251

(56) References Cited

U.S. PATENT DOCUMENTS

| | | | |
|---|---|---|---|
| 4,999,832 A | * 3/1991 | Chen et al. ................ 370/369 |
| 5,119,373 A | * 6/1992 | Fredricsson et al. ........ 370/458 |
| 5,367,517 A | * 11/1994 | Cidon et al. ................ 370/230 |
| 5,479,404 A | * 12/1995 | Francois et al. ............ 370/452 |
| 6,003,062 A | * 12/1999 | Greenberg et al. .......... 370/230 |

* cited by examiner

Primary Examiner—Min Jung
Assistant Examiner—Andy Lee

(57) ABSTRACT

There is disclosed, for use in communication network, a network communications manager capable of controlling data transfers among a server and a plurality of client nodes coupled by a network ring. The network communications manager comprises a time quanta controller capable of dividing a time frame on the network ring into distinct time quanta and assigning to each of the plurality of client nodes a predetermined time quantum during which the each of the plurality of client nodes may transmit data.

20 Claims, 4 Drawing Sheets

SYSTEMS AND METHODS FOR OPTIMIZING COMMUNICATIONS IN AN ETHERNET NETWORK

TECHNICAL FIELD OF THE INVENTION

The present invention is directed, in general, to communications networks and, more specifically, to an Ethernet network topology optimized for handling telecommunications traffic.

BACKGROUND OF THE INVENTION

In 1996, more than 75 million people worldwide used cellular telephones. Reliable predictions indicate that there will be over 300 million cellular telephone customers by the year 2000. Within the United States, cellular service is offered not only by dedicated cellular service providers, but also by the regional Bell companies, such as U.S. West, Bell Atlantic and Southwestern Bell, and the national long distance companies, such as AT&T and Sprint. The enhanced competition has driven the price of cellular service down to the point where it is affordable to a large segment of the population.

This competition has also led to rapid and sweeping innovations in cellular telephone technology. Analog cellular systems are now competing with digital cellular systems. Heavy investments are being made in TDMA, CDMA, FDMA, and other similar technologies. Increasingly, the cellular telephone system is being used to handle high bandwidth traffic, such as video and data, in combination with traditional voice traffic.

A wide variety of wireline backbones have been proposed to support the different requirements of different types of wireless traffic. For example, CDMA telecommunications equipment requires very reliable, high capacity, fast throughput, low delay, and simple connections for voice and signaling traffic, while command and control message traffic is typically less bandwidth demanding and can tolerate higher delays. These diverse requirements may result in two networks being implemented: one for voice and signaling traffic and one for command and control messages. In such an implementation, a star network architecture may be more suitable for one type of data traffic and a ring network architecture may be more suitable to another type of data traffic.

The comparative advantages and disadvantages of star and ring architectures are well-known. In an Ethernet star topology, for example, each interface on the network server provides a point-to-point connection between the server and a single client device, or node. Thus, the server requires a separate interface for each client device. There are numerous advantages to this star architecture. Bandwidth is available on demand on each client connection, since there are no other devices with which to contend. This results in high utilization and a fixed delay for each client connection. Additionally, the failure of single node will not interfere with communications between the server and another node.

However, the point-to-point connection also increases hardware costs, since each client requires a separate interface; increases power consumption, and, as a practical matter, limits the expansion capability of the network. The point-to-point connection also means that node-to-node communication is a multiple step process requiring the involvement of the network server. This increases processing requirements and allows a single point of failure for all network routing.

In an Ethernet ring topology, the network server and all client nodes are connected via individual interfaces to a common interconnection bus. The server and each node have an address on the common bus and communications layer addressing provides point-to-point communications. The server and the client nodes each have routing tables containing addresses of other devices. There are numerous advantages to the ring architecture. The server requires only one interface, thereby reducing hardware costs and power consumption. The shared interconnection bus allows for easy expansion of the network to a comparatively large size. Nodes can communicate directly, without intervention by the server. Additionally, failure of the server or an individual client device will completely shut down the network.

However, in a ring topology, bandwidth is limited due to the contention-oriented nature of shared bus communications. Each client node can access the common ring independently, thereby causing collisions and delays of variable and unpredictable length. Also, a failure of the communication interface of even a single node or the server can cause a hang-up on the common bus, thereby causing a communication failure for the entire network.

There is therefore a need in the art for an improved communication network that achieves the benefits of both a ring architecture and a star architecture, while eliminating or minimizing their attendant drawbacks. In particular, there is a need in the art for an improved Ethernet interconnection network that for use in a wireless communication network, such as a CDMA telecommunications network.

SUMMARY OF THE INVENTION

To address the above-discussed deficiencies of the prior art, it is a primary object of the present invention to provide, for use in a communication network, a network communications manager capable of controlling data transfers among a server and a plurality of client nodes coupled by a network ring. The network communications manager comprises a time quanta controller capable of dividing a time frame on the network ring into distinct time quanta and assigning to each of the plurality of client nodes a predetermined time quantum during which the each of the plurality of client nodes may transmit data.

According to one embodiment of the present invention, the predetermined time quantum has a minimum duration to thereby ensure that the each of the plurality of client nodes is able to communicate for a minimum-length time quantum during each time frame.

In another embodiment, the time quanta controller assigns to the server a predetermined time quantum during which the server may transmit data.

According to another embodiment of the present invention, the time quanta controller is capable of assigning to each of the plurality of client nodes an additional time quantum during which the each of the plurality of client nodes may transmit data.

In still another embodiment of the present invention, the predetermined time quantum and the additional time quantum allocated to each client node occur sequentially.

In yet another embodiment of the present invention, the time quanta controller is capable of assigning to the server an additional time quantum during which the server may transmit data.

According to a further embodiment of the present invention the predetermined time quantum and the additional time quantum allocated to the server occur sequentially.

In a still further embodiment of the present invention, the network communications manager transmits a synchronization signal on the network ring capable of synchronizing data transmission by the server and the plurality of client nodes.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is, inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged network.

Figure 1:
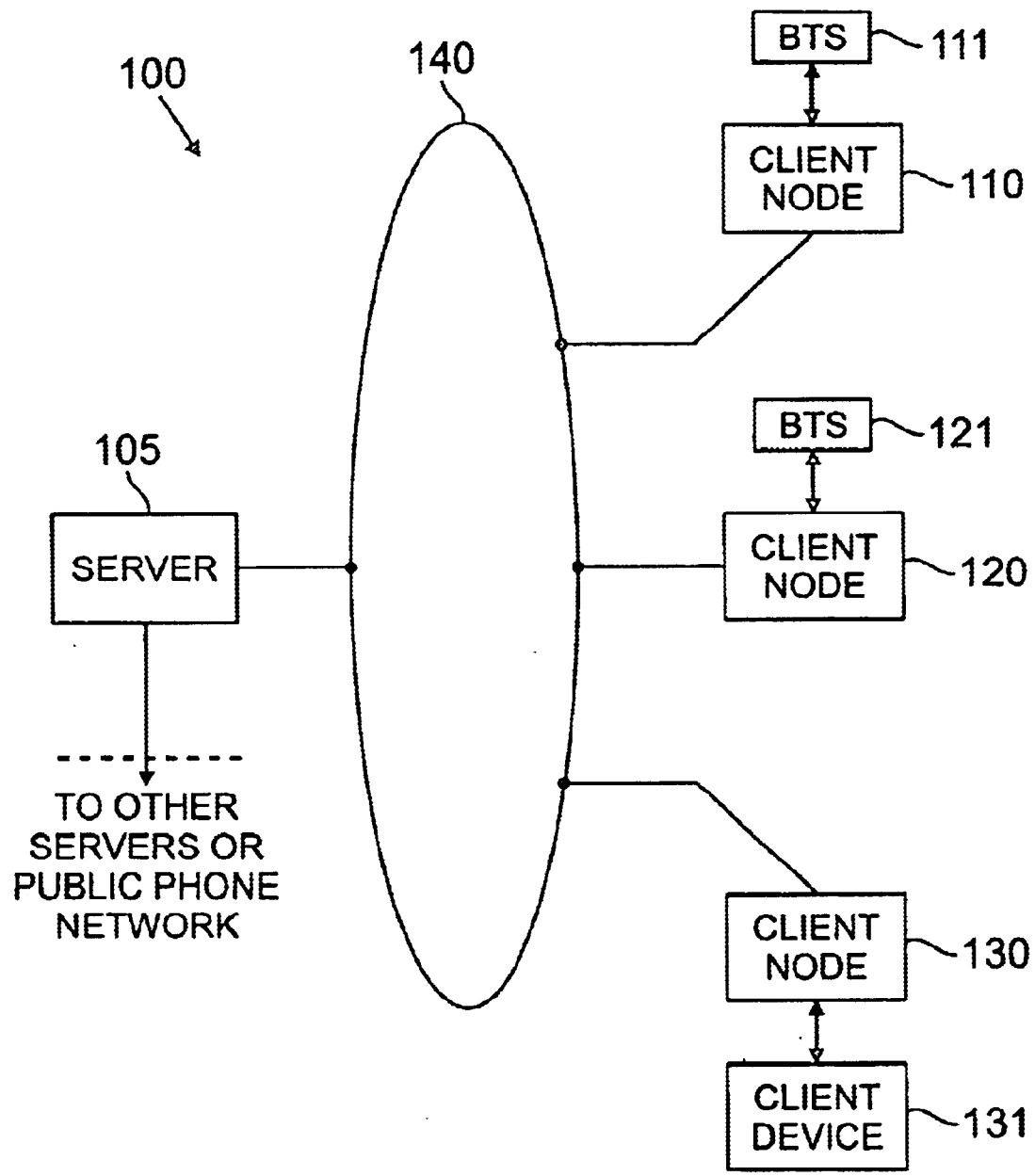
FIG. 1 illustrates a network infrastructure 100 according to one embodiment of the present invention.

FIG. 1 illustrates an exemplary network infrastructure 100 according to one embodiment of the present invention. In the exemplary embodiment shown, network infrastructure 110 provides connectivity between various devices in a wireless telecommunications network. This is done for the purposes of illustration and description only. Those skilled in the art will readily recognize that the present invention may be implemented in a wide variety of network architectures other than wireless telecommunications networks.

Network infrastructure 110 comprises network server 105 coupled to client node 110, client node 120, and client node 130 in a ring topology by a common network link 140. Client node 110 provides network communications capability to base transceiver station (BTS) 111 in a wireless network. Likewise, client node 120 also provides network communications capability to base transceiver station (BTS) 121 in the wireless network. Client node 130 provides network communication to client device 131. Client device 131 may be any type of processing, storage, or I/O device, including a database device, a printer, a network management device, another network, or the like.

BTS 111 and BTS 121 each contain RF receivers and RF transmitters to support two-way communications with various types of mobile units, including cellular telephones, personal communications system (PCS) devices, portable (laptop) computers, two-way pagers, and the like. In a preferred embodiment of the present invention, BTS 111 and BTS 121 provide wireless communication in a CDMA network.

Client node 110, client node 120, and client node 130 may exchange data directly with each other or, optionally, through network server 105, if desired. If a mobile phone user being served by BTS 111 is engaged in a phone conversation with another mobile phone user being served by BTS 121, the voice data of both parties can be transmitted directly between client nodes 110 and 120 via network link 10 without passing through server 105. Many mobile phone calls, however, are likely to be connected to a telephone device outside network infrastructure 100. These "outside" calls may be transferred through network server 105 to another server, or to the public phone network. Alternatively, outside calls may be routed through client device 13 if client device 131 is a communication device, such as a router, gateway, or server.

The topology of network infrastructure 100 is similar to that of an Ethernet ring topology. Additionally, the communications scheme between and among network server 105, client node 110, client node 120, and client node 130 is still point-to-point using network addressing, as in a ring network. In this way, each transmitting node communicates directly with a destination node in the architecture.

However, the present invention, differs from a conventional ring architecture in the nodes are not allowed to access the network ring (i.e., network link 140) indiscriminately and thereby cause contention problems that result in variable delays. Instead, the present invention implements a novel scheme for dividing and allocating the ring bandwidth into logical time quantum as explained below.

Figure 2:
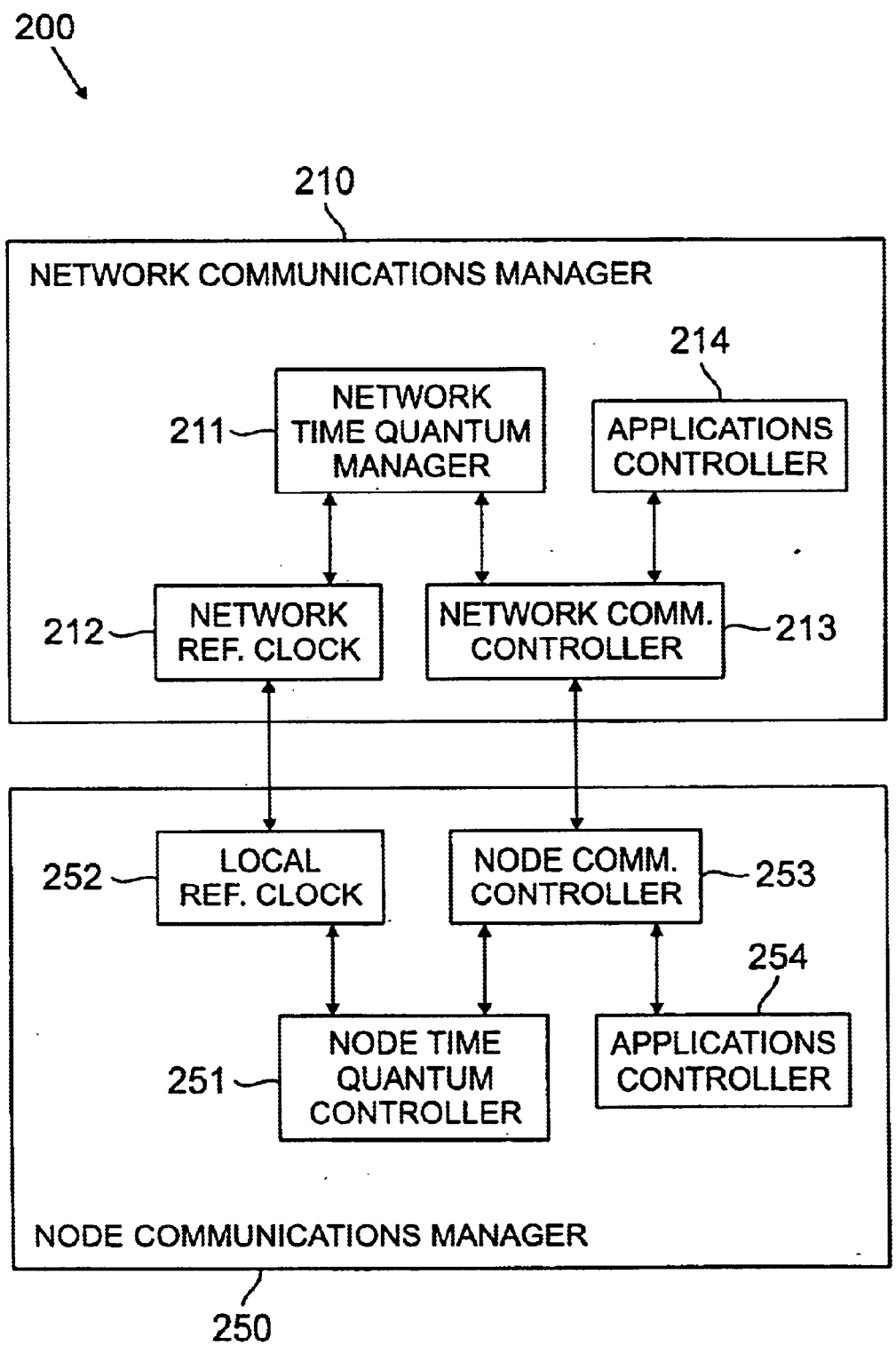
FIG. 2 illustrates an exemplary communications interface for providing communications between a network communications manager in network server and a node communications manager in any one of the client nodes in the network infrastructure according to one embodiment of the present invention.

FIG. 2 illustrates an exemplary communications interface 200 for providing communications between an exemplary network communications manager 210 in network server 105 and an exemplary node communications manager 250 in any one of client nodes 110, 120, or 130 in exemplary network infrastructure 100 in FIG. 1, according to one embodiment of the present invention.

Figure 3:
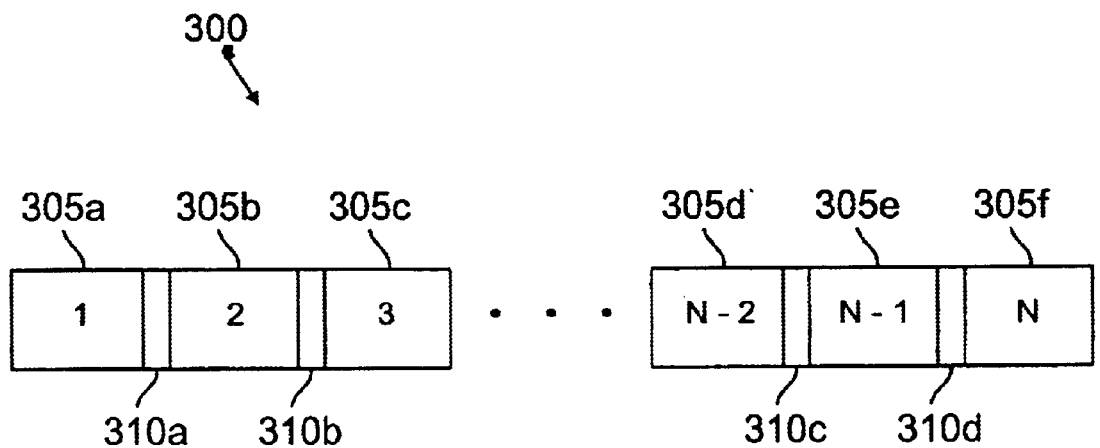
FIG. 3 is a timing diagram illustrating the logical "time slicing" of data traffic into time quanta on network the link in the network infrastructure in FIG. 1 according to one embodiment of the present invention.
Figure 4:
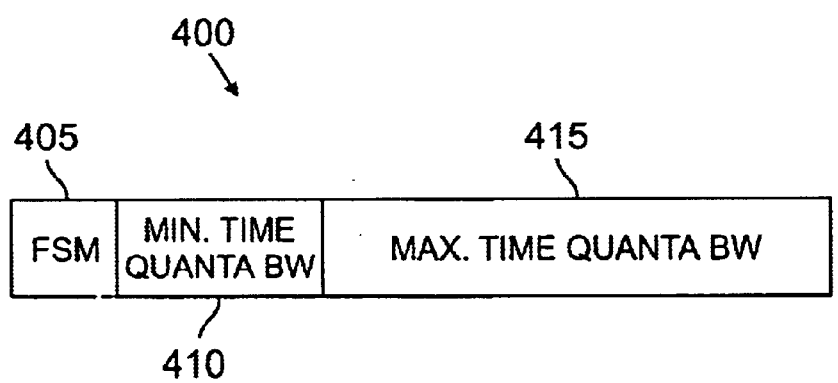
FIG. 4 is a timing diagram illustrating an entire ring time frame on network link in network infrastructure according to one embodiment of the present invention.

Network communications manager 210 comprises time quantum manager 211, network reference clock 212, server communications controller 213, and applications controller 214. Node communications manager 250 comprises node time quantum controller 251, local reference clock 252, node communications controller 253, and applications controller 254. The following descriptions of the operations of network communications manager 210 and each of its components and node communications manager 250 and each of its components are made with reference to FIGS. 3 and 4. FIG. 3 is a timing diagram illustrating the logical "time slicing" of data traffic 300 into time quanta on network link 140 in network infrastructure 100 according to one embodiment of the present invention. FIG. 4 is a timing diagram illustrating an entire ring time frame 400 on network link 140 in network infrastructure 100 according to one embodiment of the present invention.

Data traffic 300 comprises time quanta 305a–305f (or time slices) separated by guard bands 310a–310d. Guard bands 310a–310d are time delays separating the end of a data transmission by one of client nodes 110, 120 and 130 or server 105 and the start of the next data transmission by another of client nodes 110, 120 and 130 and server 105. Guard bands 310a–310d prevent collisions by simultaneously transmitting network devices. Time quanta 305a–305f are allocated among network server 105 and client nodes 110, 120 and 130. Time quanta 305a–305f may be pre-allocated between client nodes 110, 120 and 130 or may be allocated on demand from client nodes 110, 120 and 130. According to a preferred embodiment of the present invention, time quanta 305a–305f are partially pre-allocated and partially allocated on demand.

Each of client nodes 110, 120 and 130 is pre-allocated a minimum and maximum amount of time quanta. The minimum time quanta level allocated to each of client nodes 110, 120 and 130 ensures that command signaling can occur without forcing contention among client nodes 110, 120 and 130. The maximum time quanta allocated to each of client nodes 110, 120 and 130 ensures that signaling and other traffic meet uniform traffic expectations under equal load distribution among client nodes 110, 120 and 130. Dynamic allocation occurs as each of client nodes 110, 120 and 130 uses or does not use its maximum allocated bandwidth. Traffic loading is always random and thus different ones of client nodes 110, 120 and 130 become more heavily utilized as others are less utilized.

The allocations of time quanta are determined by network time quantum manager 211 in server 105 and node time quantum controller 251 in each of client nodes 110, 120 and 130. The centralized network time quantum manager 211 predicts bandwidth utilization as a function of demand. As certain ones of client nodes 110, 120 and 130 experience increasing levels of traffic demand, network time quantum manager 211 detects the trend and re-allocates time quanta from one or more of client nodes 110, 120 and 130 to one or more of client nodes 110, 120 and 130. As traffic decreases on the busy nodes, network time quantum manager 211 shifts the time quanta back to the original nodes for latter re-allocation.

To perform the foregoing time quanta re-allocations, network time quantum manager 211 and node time quantum controller 251 in each of client nodes 110, 120 and 130 execute numerous service requests and service responses. Node time quantum controller 251 provides functionality in the client nodes that is complementary to the functionality provided by network time quantum manager 211 in server 105. The Request Time Quantum service allows client nodes 110, 120 and 130 to request additional time quanta as their respective loads increase. The Allocate Time Quantum response informs the requesting one of client nodes 110, 120 and 130 whether the request is granted and which time quanta are re-allocated. In a preferred embodiment of the present invention, time quanta are allocated in blocks to client nodes 110, 120 and 130. This allows each one of client nodes 110, 120 and 130 to group time quanta together, thus minimizing guard band overhead.

The Usage Measurements service request allows network time quantum manager 211 to record the actual bit and time quanta usage of each of client nodes 110, 120 and 130. This provides two advantages. First, traffic trend management is facilitated because the transmission of more data bits during each allocated time quanta indicates a rising bandwidth demand from the corresponding client node. Network time quantum manager 211 detects the rising demand and allocates more time quanta using the Allocate Time Quantum response. This results in an anticipatory re-allocation to time quanta within network infrastructure 100, thereby minimizing delay.

Second, network time quantum manager 211 may generate usage reports for the network operator and any other subscriber of the Usage Measurements service. Usage reports may comprise a network summary and/or individual client node summaries of total number of packets sent, bits per packet, time quanta utilization, etc. The Time Quantum Audit service request and the Time Quantum Audit response ensure that node time quantum controller 251 in each one of client nodes 110, 120 and 130 and network time quantum manager 211 agree on the assigned and idle time quanta.

The Time Quantum Synchronization service synchronizes local reference clock 252 in each one of client nodes 110, 120 and 130 with network reference clock 212. This synchronization of all network clocks enables each one of client nodes 110, 120 and 130 to know when the next frame on network link 140 starts. Thus, each client node can begin transmitting data in its own time quantum after an appropriate delay to provide a sufficient time guard 310 between its own transmission and the end of data transmission in the immediately preceding time quantum.

Conventional Ethernet architectures transmit and receive randomly. The transceiver circuitry in prior art nodes and servers must transmit and receive ("listen") simultaneously on network link 140. The prior art transceivers must receive while transmitting in order to verify that no other client node or server transmitted while it was transmitting. A collision occurs when multiple transceiver transmits simultaneously, thus garbling the message and requiring retransmission. All transceivers must pause a random time delay before re-transmitting.

However, in the present invention, network communications controller 213 in server 105 and node communications controller 253 in each of client nodes 110, 120 and 130 transmit only during the allocated time quanta, thus guaranteeing no data collisions. All network devices-receive regardless of the current time quanta.

Applications controller 254 in client nodes 110, 120 and 130 and applications controller 214 in server 105 are responsible for the successful transport of data between and among server 105 and client nodes 110, 120 and 130. Network reference clock 212 comprises circuitry and software necessary to initialize, read, and maintain a system clock. Network communications controller 213 is a protocol engine for transporting data between server 105 and client nodes 110, 120 and 130.

Network communications controller 213 performs the following services: 1) transmission and reception of data in time quanta; 2) network communications protocol compliance, and 3) communications hardware initialization and management. The latter two services are traditional communication roles, while the first service is unique to the present invention.

Network communications controller 213 is responsible for the prioritization of message routing, packet assembly and disassembly, and transport delivery. Message prioritization provides traffic routing prioritization according to traffic rules provided in the configuration database. In one embodiment of the present invention, priority is given to emergency control commands, which are allocated to be sent first. The emergency control commands are restricted in usage, frequency and size. Usage is limited to a select subset of operator commands and command messages (e.g. reset, overload, and reconfigure).

Traffic messages are second in priority and can be sub-divided into either voice or data. In CDMA systems, voice and circuit data traffic messages are by their very nature very short and generally uniform on a per-conversation basis. The traffic control (or "traffic shaping") required for these messages is generally accounted for in the distribution of time quanta and the nature of individual voice conversations.

Packet data traffic, which is third in priority, generally requires additional traffic shaping. Packet data traffic is sub-divided into packets of voice size and sent on a 1:N basis where N is the number of voice traffic packets to be sent. The value N can be adjusted by the network operator and/or by the load of the system. As the number of voice traffic packets in the system decreases, the ratio 1:N drops as an inverse function of idle time. Voice delay is kept constant by using excess idle time to transmit packet data.

Commands and responses are fourth in routing priority. Short messages are given priority while long messages are sub-divided into voice size packets. The ratio is limited to 1:N, where N is typically 3 but is configurable by the network operator. This ratio reduces when there are fewer short messages and more long messages can be sent. Idle time is used as needed according to prescribed traffic rules. Since packet size is being restricted applications controller 214 provides a packet assembly and disassembly function. Additionally, end-to-end communications is guaranteed by transport compliance. The second two services are typical of network transport layer functionality and require no further elaboration.

Exemplary ring time frame 400 in FIG. 4 comprises a frame synchronization message (FSM) 405, minimum time quanta bandwidth block 410, and maximum time quanta bandwidth block 415. The frame synchronization message is transmitted by network communication controller 213 at the start of each ring transmission frame on network link 140 in order to alert and synchronize all of client nodes 110, 120 and 130 to the new ring frame. The minimum time quanta that are pre-allocated to server 105 and each of client nodes 110, 120 and 130 are logically combined and represented as minimum time quanta bandwidth block 410. The remaining portion of ring frame 400, maximum time quanta bandwidth block 415, represents the allocatable time that network time quantum manager 211 may distribute among server 105 and client nodes 110, 120 and 130.

The separation of minimum time quanta bandwidth block 410 and maximum time quanta bandwidth block 415 into distinct time periods is not intended to mean that the pre-allocated minimum time given to server 105 and each of client nodes 110, 120 and 130 must occur during minimum time quanta bandwidth block 415 and that any additional time distributed to server 105 or one or more of client a nodes 110, 120 and 130 must occur later during maximum time quanta bandwidth block 415. As noted above, in some embodiments of the present invention, it is preferable that at least some client nodes be able to group together all time quanta allocated to the client nodes in order to minimize overhead due to guard bands.

Accordingly, in one embodiment of the present invention, the minimum time quanta pre-allocated to each of server 105 and client nodes 110, 120 and 130 may be grouped together in a single time block during ring frame 400 and additional time quanta allocated on demand may be grouped together in a separate time block during ring frame 400. However, in an alternate embodiment of the present invention, the minimum time quanta pre-allocated to each of server 105 and client nodes 110, 120 and 130 may be grouped together with the additional time quanta allocated on demand to each of server 105 and client nodes 110, 120 and 130. In this latter alternate embodiment, minimum time quanta bandwidth block 410 and maximum time quanta bandwidth block 415 are essentially interleaved with each other.

Figure 5:
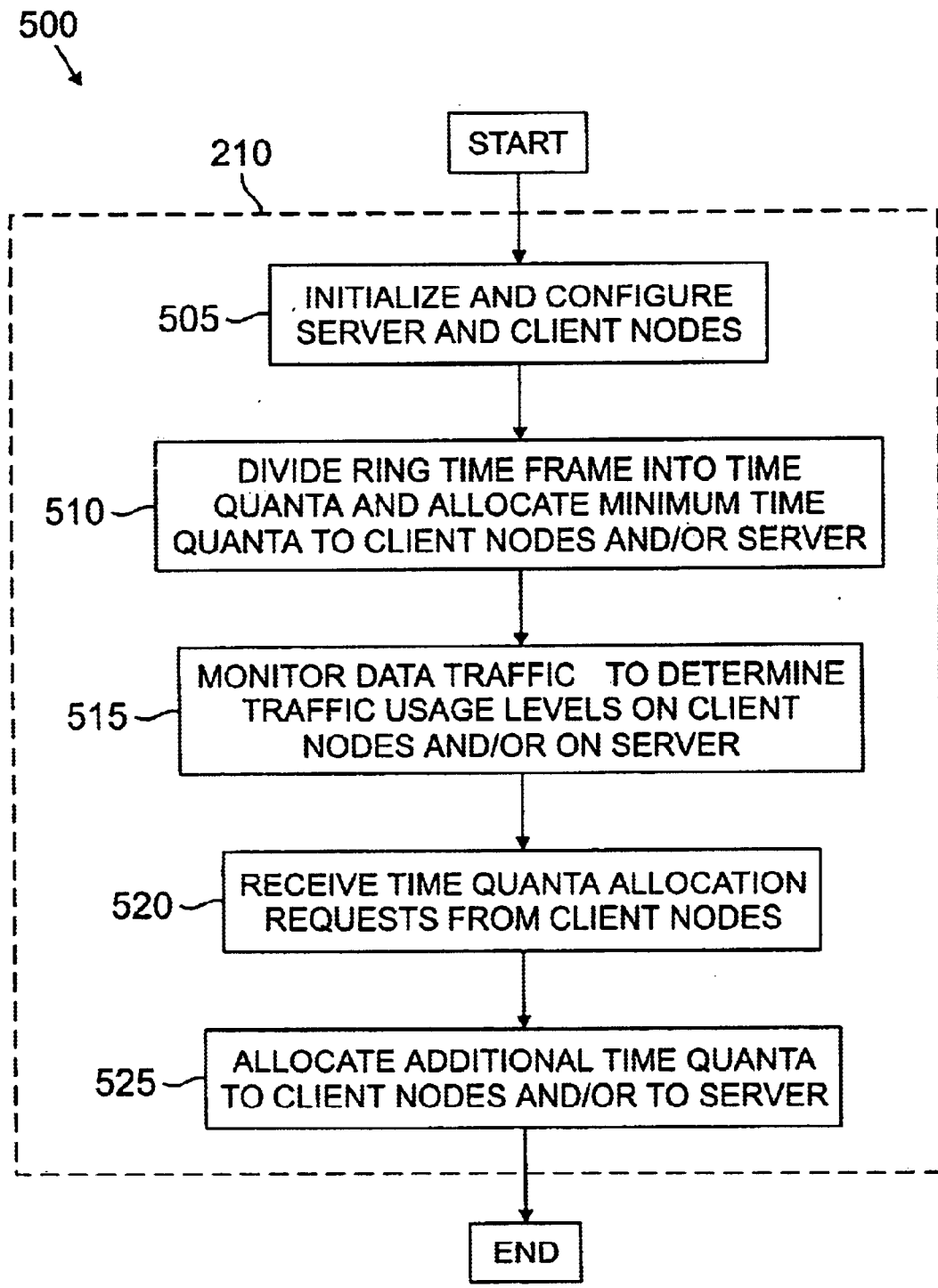
FIG. 5 is a flow diagram illustrating the operation of the exemplary network infrastructure according to one embodiment of the present invention.

FIG. 5 is a flow diagram 500 illustrating the operation of the exemplary network infrastructure 100 according to one embodiment of the present invention. Upon startup, network communications manager 210 initializes and configures each of client nodes 110, 120 and 130 (process step 505). Next, network communications manager 210 divides ring time frame 400 on the network link 140 into a plurality of time quanta 305a–305f and allocates to each of client nodes 110, 120 and 130 a pre-determined minimum-length time quanta during which each of client nodes 110, 120 and 130 may transmit data (process step 510). Network communications manager 210 also allocates to server 105 a pre-determined time quanta during which server 105 may transmit data.

As data is transmitted by server 105 and each of client nodes 110, 120 and 130, network communications manager 210 monitors data traffic (i.e, usage measurements) on network link 140 to determine data traffic loads on each of client nodes 110, 120 and 130 (process step 515). Network communications manager 210 also may receive from one or more of client nodes 110, 120 and 130 requests for allocations of additional time quanta (process step 520). In response to these requests and/or to the measured/monitored data traffic levels, network communications manager 210 may allocate to one or more of client nodes 110, 120 and 130 additional time quanta during which client nodes 110, 120 and 130 may transmit data (process step 525).

Advantageously, the present invention may be implemented in many network architectures by means of software modifications and generally will not require special hardware. This makes the solution unique compared to star architectures that use hardware to prevent time blockages.

The combination by the present invention of various attributes of Ethernet ring and star architectures results in a hybrid solution that gains some of the advantages of both architectures without the attendant disadvantages of either architecture. The implementation of software-based time quanta eliminates the variable nature of Ethernet delays due to collisions while simultaneously allowing the merging of different networks into a single physical network. The implementation of traffic management functions in the network transport layer further allows the mixing of voice, video, data, and command messages while minimizing and smoothing delay. Finally, the traffic shaping functions in network time quantum manager 211 allow the dynamic allocation of bandwidth necessary for traffic loads combining voice, video, data, and commands.

Although the present invention has been described in detail, those skilled in the art should understand that they can make various changes, substitutions and alterations herein without departing from the spirit and scope of the invention in its broadest form.

What is claimed is:

1. For use in a communication network comprising a server and a plurality of client nodes coupled by a network ring, a network communications manager capable of controlling data transfers among said server and said plurality of client nodes, said network communications manager comprising:

a time quanta controller capable of dividing a time frame on said network ring into distinct time quanta and assigning to each of said plurality of client nodes a predetermined transmit-only time quantum during which only said each of said plurality of client nodes may only transmit data and wherein said predetermined transmit-only time quantum has a minimum duration to thereby ensure that said each of said plurality of client nodes is able to communicate for a minimum-length time quantum during each time frame, wherein each of said client nodes is allocated with the minimum-length time quantum and a maximum-length time quantum.

2. The network communications manager set forth in claim 1 wherein said time quanta controller assigns to said server a predetermined transmit-only time quantum during which said server may transmit data.

3. The network communications manager set forth in claim 1 wherein said time quanta controller is capable of assigning to each of said plurality of client nodes an additional transmit-only time quantum during which said each of said plurality of client nodes may transmit data.

4. The network communications manager set forth in claim 3 wherein said predetermined transmit-only time quantum and said additional transmit-only time quantum occur sequentially.

5. The network communications manager set forth in claim 1 wherein said time quanta controller is capable of assigning to said server an additional transmit-only time quantum during which said server may transmit data.

6. The network communications manager set forth in claim 5 wherein said predetermined transmit-only time quantum and said additional transmit-only time quantum occur sequentially.

7. The network communications manager set forth in claim 1 wherein said network communications manager transmits a synchronization signal on said network ring capable of synchronizing data transmission by said server and said plurality of client nodes.

8. A communication network comprising:

a server;

a plurality of client nodes coupled to said server by a network ring;

a network communications manager capable of controlling data transfers among said server and said plurality of client nodes, said network communications manager comprising:

a time quanta controller capable of dividing a time frame on said network ring into distinct time quanta and assigning to each of said plurality of client nodes a predetermined transmit-only time quantum during which only said each of said plurality of client nodes may only transmit data and wherein said predetermined transmit-only time quantum has a minimum duration to thereby ensure that said each of said plurality of client nodes is able to communicate for a minimum-length time quantum during each time frame, wherein each of said client nodes is allocated with the minimum-length time quantum and a maximum-length time quantum.

9. The communication network set forth in claim 8 wherein said time quanta controller assigns to said server a predetermined transmit-only time quantum during which said server may transmit data.

10. The communication network set forth in claim 8 wherein said time quanta controller is capable of assigning to each of said plurality of client nodes an additional transmit-only time quantum during which said each of said plurality of client nodes may transmit data.

11. The communication network set forth in claim 10 wherein said predetermined transmit-only time quantum and said additional transmit-only time quantum occur sequentially.

12. The communication network set forth in claim 8 wherein said time quanta controller is capable of assigning to said server an additional transmit-only time quantum during which said server may transmit data.

13. The communication network set forth in claim 12 wherein said predetermined transmit-only time quantum and said additional transmit-only time quantum occur sequentially.

14. The communication network set forth in claim 8 wherein said network communications manager transmits a synchronization signal on said network ring capable of synchronizing data transmission by said server and said plurality of client nodes.

15. For use in a communication network comprising a server and a plurality of client nodes coupled by a network ring, a method of controlling data transfers among the server and the plurality of client nodes, the method comprising the steps of:

dividing a data transmission time frame on the network ring into a plurality of time quanta;

allocating to each of the plurality of client nodes a predetermined transmit-only time quanta during which only said each of the plurality of client nodes may only transmit data and wherein said predetermined transmit-only time quantum has a minimum duration to thereby ensure that said each of said plurality of client nodes is able to communicate for a minimum-length time quantum during each time frame, wherein each of said client nodes is allocated with the minimum-length time quantum and a maximum-length time quantum.

16. The method set forth in claim 15 including the further step of allocating to the server a pre-determined transmit-only time quanta during which the server may transmit data.

17. The method set forth in claim 15 including the further step of monitoring data traffic on the network ring to determine data traffic loads on the plurality of client nodes.

18. The method set forth in claim 15 including the further steps of receiving from at least one client node an allocation request and, in response thereto, allocating to the at least one client node an additional transmit-only time quanta during which the at least one client node may only transmit data.

19. The network communications manager set forth in claim 1, wherein:

the time quanta controller is operable to pre-allocate the minimum-length time quantum and the maximum-length time quantum to each of the client nodes; and the time quanta controller is further operable to dynamically allocate at least a portion of the assigned quantum from at least one of the client nodes to at least one other of the client nodes.

20. The communication network set forth in claim 8 wherein:

the time quanta controller is operable to pre-allocate the minimum-length time quantum and the maximum-length time quantum to each of the client nodes; and the time quanta controller is further operable to dynamically allocate at least a portion of the assigned quantum from at least one of the client nodes to at least one other of the client nodes.

\* \* \* \* \*